United States Patent
Sundstrom et al.

(10) Patent No.: US 8,243,580 B2
(45) Date of Patent: *Aug. 14, 2012

(54) DYNAMIC ALLOCATION OF CYCLIC EXTENSION IN ORTHOGONAL FREQUENCY DIVISION MULTIPLEXING SYSTEMS

(75) Inventors: Kurt E. Sundstrom, Woodinville, WA (US); Ernest Tsui, Cupertino, CA (US); Richard B. Nicholls, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/172,883

(22) Filed: Jul. 14, 2008

(65) Prior Publication Data

US 2008/0273580 A1  Nov. 6, 2008

Related U.S. Application Data

(63) Continuation of application No. 10/425,429, filed on Apr. 29, 2003, now Pat. No. 7,400,573.

(51) Int. Cl.
 *H04J 11/00* (2006.01)
(52) U.S. Cl. .......................... 370/208; 375/260; 375/348
(58) Field of Classification Search .................. 370/203, 370/208–210; 375/260, 346–348
 See application file for complete search history.

(56) References Cited

U.S. PATENT DOCUMENTS

| | | | |
|---|---|---|---|
| 5,442,696 A | 8/1995 | Lindberg et al. | |
| 6,088,327 A | 7/2000 | Muschallik et al. | |
| 6,577,603 B1 | 6/2003 | Hakalin et al. | |
| 6,674,855 B1 | 1/2004 | Karelic et al. | |
| 6,956,812 B2 | 10/2005 | Okada et al. | |
| 6,996,199 B2* | 2/2006 | Storm et al. | 375/350 |
| 7,010,049 B1 | 3/2006 | Jones et al. | |
| 7,327,800 B2* | 2/2008 | Oprea et al. | 370/203 |
| 7,400,573 B2 | 7/2008 | Sundstrom et al. | |
| 2003/0231582 A1 | 12/2003 | Logvinov et al. | |
| 2004/0066754 A1* | 4/2004 | Hottinen | 370/252 |
| 2004/0081131 A1 | 4/2004 | Walton et al. | |
| 2004/0213145 A1 | 10/2004 | Nakamura | |
| 2004/0264605 A1* | 12/2004 | Kyosti et al. | 375/340 |
| 2005/0170783 A1* | 8/2005 | Krishnan et al. | 455/67.11 |
| 2005/0220201 A1* | 10/2005 | Laroia et al. | 375/260 |
| 2006/0120275 A1* | 6/2006 | Muck et al. | 370/210 |

FOREIGN PATENT DOCUMENTS

WO   WO-03047140 A1   6/2003

OTHER PUBLICATIONS

Malaysian Application Serial No. PI 20041587, Office Action mailed Jun. 13, 2008, 2 pgs.
Malaysian Application Serial No. PI 20041587, Response dated Sep. 12, 2008 to Office Action mailed Jun. 13, 2008, 14 pgs.

* cited by examiner

*Primary Examiner* — Pao Sinkantarakorn
(74) *Attorney, Agent, or Firm* — Schwegman, Lundberg & Woessner, P.A.

(57) ABSTRACT

Briefly, in accordance with one embodiment of the invention, an orthogonal frequency division multiplexing system may provide a dynamically calculated cyclic extension, the length of which may be based at least in part on a delay spread due to an experienced environmental condition. The length of the cyclic extension may be calculated by determining a channel impulse response, and then computing the energy distribution of the channel impulse response. The length of the cyclic extension may then be set according to the energy distribution of the channel impulse response.

11 Claims, 2 Drawing Sheets

DYNAMIC ALLOCATION OF CYCLIC EXTENSION IN ORTHOGONAL FREQUENCY DIVISION MULTIPLEXING SYSTEMS

RELATED APPLICATION

This application is a continuation of U.S. application Ser. No. 10/425,429 filed Apr. 29, 2003, now issued as U.S. Pat. No. 7,400,573 which is incorporated by reference herein in its entirety.

BACKGROUND OF THE INVENTION

One common component of an orthogonal frequency division multiplexing (OFDM) system is the cyclic extension of each OFDM symbol. A cyclic extension, or guard interval, may be produced by replicating part of the OFDM symbol and either prepending or appending the replicated segment onto the original symbol. When attached to the frontal portion of the symbol, the cyclic extension may be referred to as a cyclic prefix extension. When attached to the terminal portion of the symbol, the cyclic extension may be referred to as a cyclic postfix extension. For example, given a set of 64 samples, the cyclic extension may be 16 samples. In the case of a prepend, the last 16 samples of the original 64 samples may be prepended to the front of the original 64 samples to result in an 80 sample symbol. In the case of an append, the first 16 samples of the original 64 samples may be appended to the end of the original 64 samples to result in an 80 sample symbol. In either case, taking 64 samples of the 80 sample symbol will result in the original 64 samples by cyclically wrap at the end back to the front if needed. The cyclic extension of an OFDM symbol converts the linear channel convolution into a cyclic convolution. An OFDM receiver exploits the properties of the cyclic convolution to mitigate inter-symbol interference and inter-carrier interference.

While the cyclic extension helps to mitigate channel distortion in an OFDM system, using a cyclic extension involves the transmission of duplicate information, and as such represents an overhead associated with an OFDM transmission scheme. Furthermore, to mitigate the effects of the channel temporal dispersion, the cyclic extension typically is required to be of a duration greater than or equal to the channel memory. For example, in a wireless local area network (WLAN) compliant with an Institute of Electrical and Electronics Engineers (IEEE) standard, such as the IEEE 802.11a standard, the cyclic extension is a predetermined length, for example 800 ns, in order to provide immunity to delay spreads up to a maximum of 800 ns. However, under typical conditions, the actual delay spread experienced is often much lower than the predetermined delay spread of 800 ns, thereby resulting in an unnecessary overhead represented by the difference between the predetermined delay spread and the actually experienced delay spread. It would therefore be desirable to provide an OFDM system in which the length of the cyclic extension may be dynamically allocated according to the actually experienced delay spread, rather than being based on the predetermined, maximum, worst case scenario delay spread. Furthermore, since the actually experienced delay spread may be different for different users, it would in addition be desirable to provide a cyclic extension length for each user based upon the actual delay spread experienced by each respective user.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
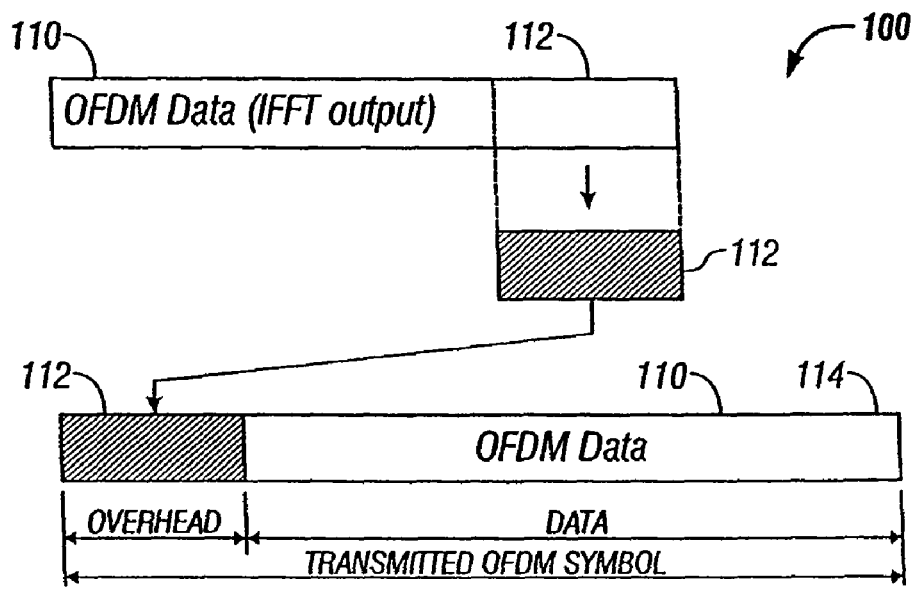
FIG. 1 is a diagram of an orthogonal frequency division multiplexing scheme utilizing a cyclic extension in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification, discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMS), electrically programmable read-only memories (EPROMS), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

Types of wireless communication systems intended to be within the scope of the present invention may include, although are not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, Time Division Synchronization Code Division Multiple Access (TDS-CDMA), and the like, although the scope of the invention is not limited in this respect.

Referring now to FIG. 1, a diagram of an orthogonal frequency division multiplexing scheme utilizing a cyclic extension in accordance with one embodiment of the present invention will be discussed. In the orthogonal frequency division multiplexing (OFDM) scheme 100 as shown in FIG. 1, OFDM data 110 may be provided at the output of an inverse fast-Fourier transform (IFFT) block such as utilized in an OFDM transceiver, although the scope of the invention is not limited in this respect. A portion of the of OFDM data 110, typically a terminal portion thereof, may be duplicated and appended to the front of OFDM data 110 as a cyclic extension 112 as shown in FIG. 1. In one embodiment of the invention, cyclic extension 112 may be prepended to the front of OFDM data 110 to provide a cyclic prefix extension. In an alternative embodiment, cyclic extension may be appended to the terminal end of OFDM data 110 to provide a cyclic postfix extension, although the scope of the invention is not limited in this respect. Thus, although FIG. 1 illustrates a prepend case, the invention is not limited in this respect, and the invention may include an append case using a cyclic extension of a first portion of OFDM data 110. The combination of OFDM data 110 and cyclic extension 112 may comprise an entire OFDM symbol 114 to be transmitted by an OFDM transmitter, although the scope of the invention is not limited in this respect.

Figure 2:
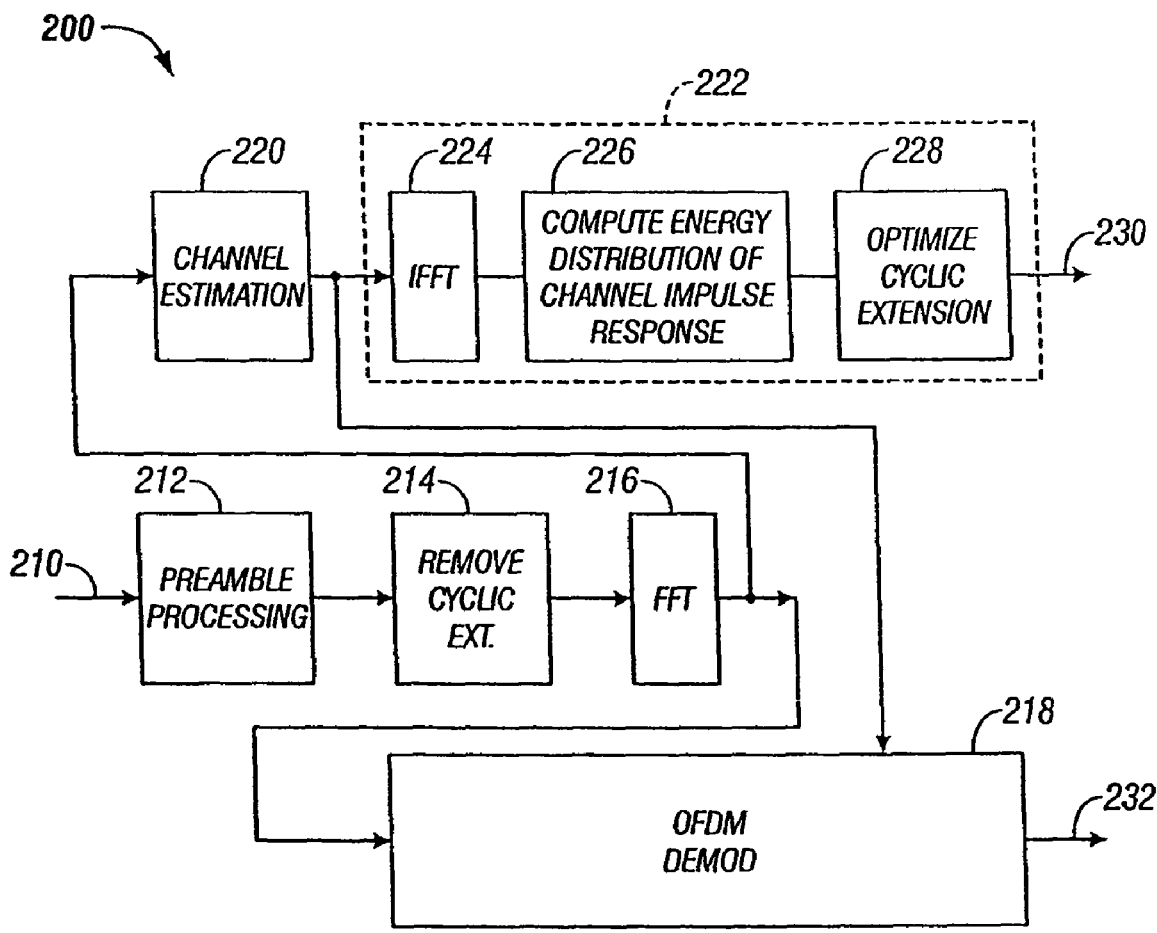
FIG. 2 is a block diagram of an orthogonal frequency division multiplexing receiver that dynamically allocates the length of a cyclic extension in accordance with one embodiment of the present invention.
Figure 4:
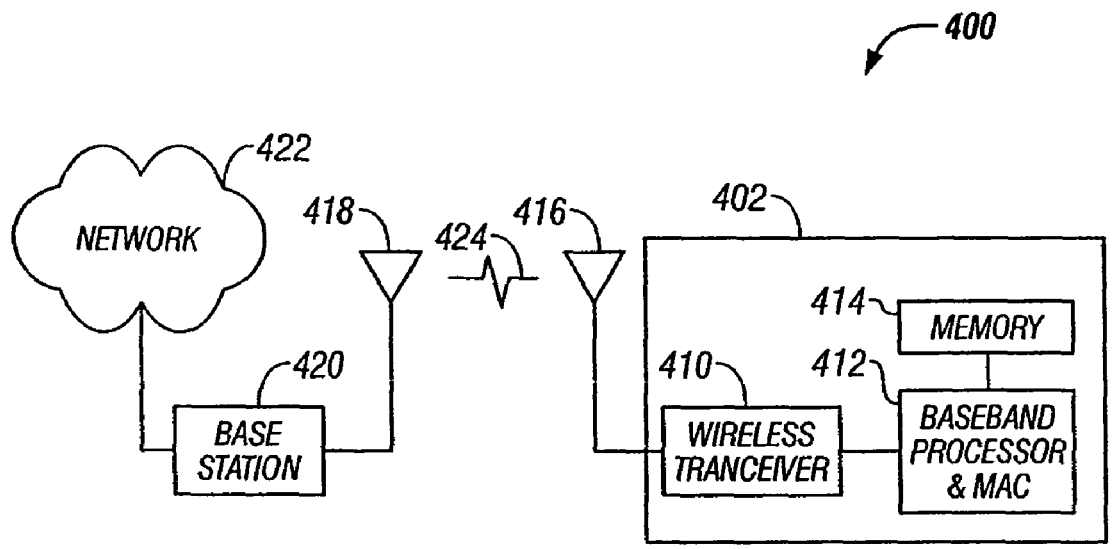
FIG. 4 is a block diagram of a wireless communication system in accordance with one embodiment of the present invention.

Referring now to FIG. 2, a block diagram of an orthogonal frequency division multiplexing receiver that dynamically allocates the length of a cyclic extension in accordance with one embodiment of the present invention. OFDM receiver 200 may be utilized in a wireless transceiver 410 as shown in FIG. 4, although the scope of the invention is not limited in this respect. As shown in FIG. 2, sample data provided by an analog-to-digital converter in a wireless transceiver may be provided to receiver 200 at an input 210 of preamble processing block 212. After preamble processing, the data may be passed to block 214 at which cyclic extension 112 may be removed from symbol data 114 to provide OFDM data 110 to a fast-Fourier transform (FFT) block 216. The output of FFT block 216 may be passed to an OFDM demodulator block 218 to demodulate OFDM data 100 to extract baseband data that may be provided at output 232 to a baseband processor such as baseband processor 412 of FIG. 4, or example for media access control (MAC) processing, although the scope of the invention is not limited in this respect.

Receiver 200 may include block 222 to determine a desired length of cyclic extension 112. In one embodiment of the invention, block 222 may be a circuit of receiver 200, although the scope of the invention is not limited in this respect. The output of FFT block 216 may be provided to channel estimation block 220, which may provide its output to block 222 to dynamically allocate the duration of cyclic extension 112 when OFDM data 110 is transmitted by wireless transceiver 410. In block 222, the output of channel estimation block 220 may be passed to an inverse fast-Fourier transform (IFFT) block 224, which may in turn provide an output to block 226. Block 226 may compute an energy distribution of the channel impulse response, and then provide an output to block 228 to calculate a new, updated duration of cyclic extension 228 for subsequent transmissions based on the energy distribution of the channel impulse response computed at block 226. The calculated new, updated duration of cyclic extension 228 may be provided at output 230 to store the new duration of cyclic extension 228 in a MAC database via baseband processor 412 so that the new, updated duration of cyclic extension 228 may be utilized for subsequent OFDM transmissions. Block 222 may continually update the duration of cyclic extension 228 as described for subsequent OFDM data 110 received by receiver 200 so that the duration of cyclic extension may be dynamically computed and changed in accordance with changing delay spreads experienced in the physical environment in which receiver 200 is utilized, although the scope of the invention is not limited in this respect.

Figure 3:
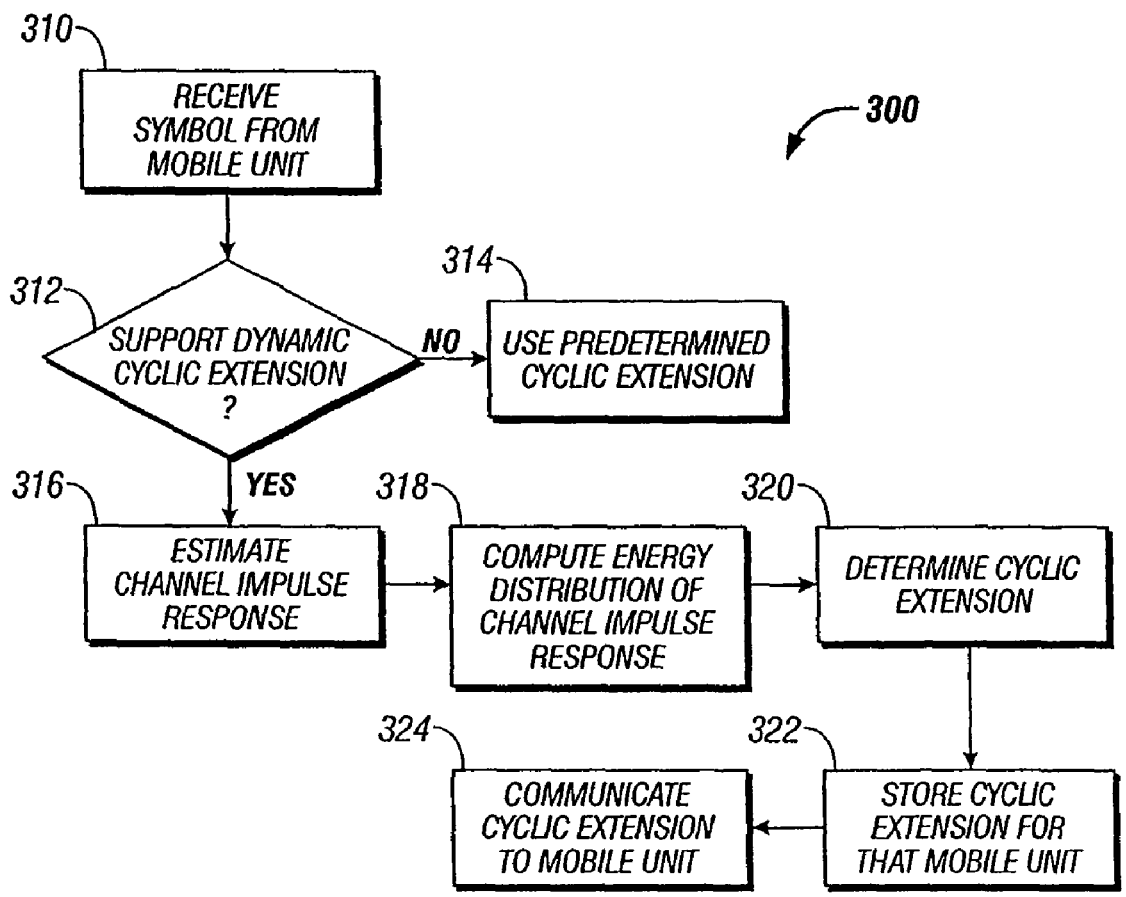
FIG. 3 is a flow diagram of a method to dynamically determine and allocate a length of a cyclic extension in an orthogonal frequency division multiplexing system in accordance with an embodiment of the present invention.

Referring now to FIG. 3, a flow diagram of a method to dynamically determine and allocate a length of a cyclic extension in an orthogonal frequency division multiplexing system in accordance with an embodiment of the present invention will be discussed. In a wireless LAN system in which there are one or more devices operating, to dynamically allocate the cyclic extension for each device, several functions may be performed utilizing method 300. For example, in a basic services set (BSS) mode, the access point, which may be for example base station 420 as shown in FIG. 4, and mobile unit 402 of FIG. 4, may have a mechanism to identify whether or not mobile unit 402 supports dynamic cyclic extension. Although a BSS mode is discussed herein, the scope of the invention is not limited in this respect and may be applied to other types of WLAN systems, for example a WLAN system operating in an infrastructure basic services set (IBSS) mode. In many WLAN systems, control frames such as beacons, association request, and association response currently exist and may be utilized to provide mechanisms for conveying capability information between the mobile unit and the access point. For example, the information elements within such frames may have unused fields that could be employed, during association or re-association, to convey that the mobile unit and the access point both support dynamic cyclic extension. Thus, such information elements and a transmitted symbol may be received from a mobile unit at block 310, and a determination may be made at block 312 whether the mobile unit supports dynamic cyclic extension. In the event either the mobile unit or the access point does not support dynamic cyclic extension, a predetermined cyclic extension may be utilized at block 314.

In the event both the access point and the mobile unit support dynamic cyclic extension, the access point may estimate the channel impulse response at block 316 as observed by a given mobile unit using the preamble or packet data information from that mobile unit. The access point may estimate the channel impulse response of the mobile unit by performing an inverse fast-Fourier transform (IFFT) on the channel estimates obtained by the access point from one or more incoming packets received from the mobile unit. For example, such estimation may be performed during an association phase or some equivalent phase when the mobile unit initiates a connection to the access point. A packet received from the mobile unit may be assumed to have employed a maximum length cyclic extension during this phase, although the scope of the invention is not limited in this respect.

From the estimate of the channel impulse response as determined at block 316, the access point then may estimate the energy distribution of the channel at block 318 and use the energy distribution to set the length of the cyclic extension 112 for that mobile unit. An algorithm may be performed in the access point to determine the energy distribution in the impulse response, for example a ratio of the total energy in the impulse response to truncated subsets of the impulse response, although the scope of the invention is no limited in this respect. The energy distribution for the channel of that particular mobile unit may then be employed to determine an appropriate new length for cyclic extension 112 at block 320. For example, if the access point determines that the majority of the energy is contained in the first half of the estimated impulse response, the access point may set the new length of cyclic extension 112 to be half the maximum length of cyclic extension.

The new cyclic extension 112 for that particular mobile unit may be stored at block 322. The access point may have a mechanism to store and access the required cyclic extension length one or more mobile units within the local BSS. In present day OFDM WLAN systems, the media access controller (MAC) in the access point may already maintain a database for each address of the mobile units to track existing mobile dependent parameters, for example per user data rate in an IEEE 802.11a compliant system. Additional information regarding the required cyclic extension for one or more mobile units may be stored within the same or a similar database and accessed in the same or a similar manner as the mobile dependent information of existing WLAN systems. The new, calculated cyclic extension may be communicated to the respective mobile unit at step 324 for subsequent communications. The access point may have a mechanism to communicate the calculated cyclic extension 112 to the respective mobile unit 402. Communicating the cyclic extension to the mobile could be performed in a like manner as other mobile dependent parameters used in today's systems. For example, in an IEEE 802.11a compliant system the data rate may be communicated in the signal field of each OFDM packet. In accordance with one embodiment of the present invention, the signal field additionally may be used to communicate the cyclic extension length to the mobile unit, although the scope of the invention is not limited in this respect.

Referring now to FIG. 4, a block diagram of a wireless communication system in accordance with one embodiment of the present invention will be discussed. In the communications system 400 shown in FIG. 4, a mobile unit 402 may include a wireless transceiver 410 to couple to an antenna 416 and to a processor 412. Processor 412 in one embodiment may comprise a single processor, or alternatively may comprise a baseband processor and an applications processor, and may implement one or more functions of the MAC layer, although the scope of the invention is not limited in this respect. Processor 412 may couple to a memory 414 which may include volatile memory such as DRAM, non-volatile memory such as flash memory or EEPROM, or alternatively may include other types of storage such as a hard disk drive, although the scope of the invention is not limited in this respect. Some portion or all of memory 414 may be included on the same integrated circuit as processor 412, or alternatively some portion or all of memory 414 may be disposed on an integrated circuit or other medium, for example a hard disk drive, that is external to the integrated circuit of processor 412, although the scope of the invention is not limited in this respect.

Mobile unit 402 may communicate with base station (or access point) 420 via wireless communication link 424, where base station 420 may include at least one antenna 418. Base station 420 may couple with network 422 so that mobile unit 402 may communicate with network 422, including devices coupled to network 422, by communicating with base station 420 via wireless communication link 424. Network 422 may include a public network such as a telephone network or the Internet, or alternatively network 422 may include a private network such as an intranet, or a combination of a public and a private network, although the scope of the invention is not limited in this respect. Communication between mobile unit 402 and base station 420 may be implemented via a wireless local area network (WLAN), for example a network compliant with a an Institute of Electrical and Electronics Engineers (IEEE) standard such as IEEE 802.11a, IEEE 802.11b, and so on, although the scope of the invention is not limited in this respect. In another embodiment, communication between mobile unit 402 and base station 420 may be implemented via a cellular communication network compliant with a 3rd Generation Partnership Project (3GPP) standard, although the scope of the invention is not limited in this respect.

Although the invention has been described with a certain degree of particularity, it should be recognized that elements thereof may be altered by persons skilled in the art without departing from the spirit and scope of the invention. It is believed that the dynamic allocation of cyclic extension in orthogonal frequency division multiplexing systems of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. An apparatus, comprising:
   a circuit to dynamically determine a cyclic extension based at least in part on an energy distribution of an impulse response of a symbol received by a transceiver when data is being transmitted by the transceiver;
   a cyclic extension circuit to calculate an updated cyclic extension based on the energy distribution; and
   an energy distribution circuit to determine an energy distribution in an impulse response of a channel, wherein the energy distribution circuit determines the energy distribution of the impulse response by calculating a ratio of a total energy in the impulse response to at least one or more truncated subsets of the impulse response.

2. An apparatus as claimed in claim 1, further comprising an inverse fast-Fourier transform circuit to compute an impulse response of a channel of the transceiver.

3. An apparatus as claimed in claim 1, further comprising an inverse fast-Fourier transform circuit to compute an impulse response of a channel of the transceiver, an energy distribution circuit to determine an energy distribution in an impulse response of a channel of the receiver, and a cyclic extension circuit to calculate an updated cyclic extension based on the energy distribution.

4. An apparatus as claimed in claim 1, further comprising an omnidirectional antenna to couple to said transceiver.

5. A method, comprising:
   estimating a channel impulse response of a received symbol;
   computing an energy distribution of the channel impulse response, wherein computing the energy distribution comprises computing a ratio of a total energy of the channel impulse response to at least one or more truncated subsets of the channel impulse response;
   determining a length of a cyclic extension based at least in part on the energy distribution of the channel impulse response;
   receiving a subsequent symbol; and
   executing said estimating, said computing, and said determining based on the subsequent symbol.

6. A method as claimed in claim 5, further comprising storing the determined length of a cyclic extension for a device from which the received symbol was transmitted, and communicating with the device using the cyclic extension having the determined length.

7. A method as claimed in claim 5, further comprising communicating the determined length of the cyclic extension to the device from which the received symbol was transmitted.

8. A method as claimed in claim 5, wherein said determining comprises dynamically determining a length of a cyclic extension based at least in part on the energy distribution of the channel impulse response when data is being transmitted by a transceiver.

9. A non-transitory machine-readable medium comprising instructions, which when implemented by one or more processors perform the following operations:
   estimating a channel impulse response of a received symbol;
   computing an energy distribution of the channel impulse response;
   determining a length of a cyclic extension based at least in part on the energy distribution of the channel impulse response;
   storing the determined length of a cyclic extension for a device from which the received symbol was transmitted;
   communicating with the device using the cyclic extension having the determined length;
   communicating the determined length of the cyclic extension to the device from which the received symbol was transmitted; and
   computing a ratio of a total energy of the channel impulse response to at least one or more truncated subsets of the channel impulse response.

10. A machine-readable medium as claimed in claim 9, wherein the instructions, when implemented by one or more processors, further perform receiving a subsequent symbol, and executing said estimating, said computing, and said determining based on the subsequent symbol.

11. A machine-readable medium as claimed in claim 9, wherein determining comprises dynamically determining a length of a cyclic extension based at least in part on the energy distribution of the channel impulse response when data is being transmitted by a transceiver.

* * * * *